(12) United States Patent
Chand et al.

(10) Patent No.: US 8,032,032 B2
(45) Date of Patent: Oct. 4, 2011

(54) BI-DIRECTIONAL OPTICAL LINK BETWEEN MULTIPLE DATA SOURCES AND A PROCESSING NODE IN AN AVIONICS PLATFORM

(75) Inventors: Naresh Chand, Warren, NJ (US); Kevin M. McNeill, Alexandria, VA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 525 days.

(21) Appl. No.: 12/291,970

(22) Filed: Nov. 14, 2008

(65) Prior Publication Data

US 2010/0124421 A1 May 20, 2010

(51) Int. Cl.
*H04B 10/00* (2006.01)
(52) U.S. Cl. ........ 398/140; 398/130; 398/135; 398/138; 398/139
(58) Field of Classification Search .................. 398/130, 398/135, 138, 140
See application file for complete search history.

(56) References Cited

U.S. PATENT DOCUMENTS

| | | | |
|---|---|---|---|
| 5,317,440 A | 5/1994 | Hsu | |
| 5,448,390 A | 9/1995 | Tsuchiya et al. | |
| 5,898,801 A | 4/1999 | Braun et al. | |
| 6,345,136 B1 | 2/2002 | Augustsson | |
| 6,400,478 B1 | 6/2002 | Cheng et al. | |
| 7,092,642 B2 * | 8/2006 | Way | 398/193 |
| 7,245,722 B2 * | 7/2007 | Hirota et al. | 380/256 |
| 2002/0044316 A1 | 4/2002 | Myers | |
| 2004/0062553 A1 | 4/2004 | Harres | |
| 2009/0202254 A1 * | 8/2009 | Majumdar et al. | 398/140 |

FOREIGN PATENT DOCUMENTS

| | | |
|---|---|---|
| DE | 19917596 B4 | 9/2005 |
| EP | 0 717 516 A1 | 6/1996 |
| JP | 2256334 A | 10/1990 |
| JP | 2000049709 A | 2/2000 |
| WO | WO2004/030244 A1 | 4/2004 |

OTHER PUBLICATIONS

L. D. Westbrook, et al., Simultaneous bi-directional analogue fibre-optic transmission using an electroabsorption modulator, Electronics Letters, vol. 32, No. 19 (Sep. 12, 1996), at pp. 1806-1807.
Schuster, et al., "Networking Concepts Comparison for Avionics Architecture",Digital Avionics Systems Conference,2008,IEEE,Piscataway, NJ, Oct. 26, 2008, pp. 1.D.1 through 1-1-11.

* cited by examiner

*Primary Examiner* — Dung Nguyen
(74) *Attorney, Agent, or Firm* — Leo Zucker

(57) ABSTRACT

A fiber optic link for platforms with data sources including, e.g., sensors, cameras, radars and antennas. An array of optical transmitter/receiver pairs is coupled to an integrating network of the platform. Data modules are each coupled to certain ones of the data sources and include a receiver for detecting control data, and a modulator for modulating a light signal according to signals from the module's data sources. At least one optical fiber is coupled between a given transmitter/receiver pair of the array, and a corresponding data module. A laser source associated with each transmitter supplies a light signal with the control data to a corresponding data module downstream over an optical fiber. The light signal is modulated by the signals from the module's data sources, and the modulated light signal is returned to an array receiver upstream over an optical fiber.

18 Claims, 9 Drawing Sheets

TIME DOMAIN: ONE LINK AT A TIME

TIME DOMAIN: SIMULTANEOUS BIDIRECTIONAL LINK

DOWNSTREAM: 2 PPM

UPSTREAM: OOK

1 TO 2 dB OPTICAL POWER PENALTY
FOR TRANSMITTING BOTH BASEBAND
AND PASSBAND SIGNALS

BI-DIRECTIONAL OPTICAL LINK BETWEEN MULTIPLE DATA SOURCES AND A PROCESSING NODE IN AN AVIONICS PLATFORM

STATEMENT OF GOVERNMENT INTEREST

This invention was made with United States Government support under Prime Contract No. H94003-04-D-0002/0016 awarded by the United States Air Force. The United States Government has certain rights in this invention.

BACKGROUND OF THE INVENTION

1. Field of the Invention

The present invention relates to an architecture for a bi-directional fiber optical link.

2. Discussion of the Known Art

The aerospace operating environment is hostile and it imposes many constraints on the engineering and design of avionics systems. Most critical is the stringent operational temperature range of from −55° C. to +125° C. Optical devices are especially susceptible to temperatures that might lead to a link failure or other catastrophic loss, and the use of cooling or heating units only increases system size, weight and power (SWAP), as well as cost. As a result, advanced jet fighters like the F35 still use IEEE 1394B protocols for electrical data distribution over copper (Cu) wire in their flight and mission control systems.

Optical networking technologies are expected to revolutionize next generation avionics and naval communication systems. Optical systems offer substantial improvements over Cu wire systems in reliability, size, weight, power efficiency, cost, security, immunity to electromagnetic interference, and networking capability. Skyrocketing fuel prices and an ever increasing demand for bandwidth make it necessary to build avionics platform networks with reduced SWAP but are nevertheless flexible, scalable and upgradeable with minimal installation and lifetime operation costs. With reduced SWAP, an air fighter can carry more fuel and ordinance over greater distances.

Optical networks are potentially capable of meeting all of the above requirements. A so-called Requirement of Optical Networks in Avionics (RONIA) program at the Defense Advanced Research Projects Agency (DARPA) estimates a total backbone capacity of about 1.4 Tb/s with about 400 nodes and over 500 links for an air fighter. The data rate per node is expected to be 1 Gb/s or greater. For example, a significant weight reduction may be achieved by eliminating heavy Cu cables. Optical data networks also offer a large suite of other benefits including resistance to electromagnetic interference (EMI) and unauthorized tapping, very large bandwidth, protocol transparency, low loss, low crosstalk with more than 40 dB isolation, corrosion resistance, and no radiation, fire ignition or electrocution hazards.

Despite their widespread use in commercial and residential deployments, optical networks currently deployed in avionics largely comprise point-to-point multimode fiber links operating at a 850 nm wavelength and use so-called Fiber Channel protocols for storage. As a result, electronic communications are still carried out mainly over Cu wiring employing ARINC 429, Avionics Full Duplex Switched Ethernet (AFDX), IEEE 1394 and US MIL-STD-1553B Standards. The IEEE 1394 protocol is used on the Joint Strike Fighter for vehicle management systems, and it supports a 400 Mb/s data transfer rate. AFDX, which is ARINC 664 (Part 7), presently supports a 100 Mb/s data rate.

Current aerospace optical fiber back plane networks can be complicated and costly to maintain and repair, and typically require built in tests (BIT) and fault diagnosis procedures in their construction. Ideally, there should be a minimal number of different spare parts needed to service the network, and replacements should preferably be carried out at a module level with ease of access.

System sensors, radar, RF antennas and cameras are the eyes and ears of an aircraft. They are sources of raw signals or data that need to be processed by an integrated core processor (ICP) located remotely from the various sources, and analyzed by the flight crew and/or other subsystems. FIG. 1 shows typical communication networks and systems within an airborne platform. The networks include, for example, networks for navigation, RF communications, tactical response, munitions control, identification and surveillance, electronic warfare, and storage. The platform also typically has a flight control and vehicle management system. Each network or system may use a different communication protocol and operate essentially independently. Communications to and from the platform are typically carried by RF waveforms, while flows of data within the platform between the various sources and the ICP may be either RF or digital baseband, with increasing movement toward the latter. The data may be continuous, random, or bursty.

In a data centric system, the core of an integration of the various platform systems should preferably be a unified network or data bus that will support transparent operation of a variety of otherwise incompatible protocols of the different systems. Optical networks can support the various protocols whether analog or digital. The ability of a core integrating network to support both analog and digital signals would provide a significant gain in SWAP by eliminating the present need for a separate RF cabling infrastructure.

U.S. Patent Application Publication No. 2004/0062553 (Apr. 1, 2004) describes a bidirectional optical link between first and second data units using a single optical source. In the disclosed embodiment, the first data unit is a transmit/receive unit associated with an aircraft. The second data unit is a ground terminal including a modulator/optical receiver system. A splitter element in the optical receiver system receives a modulated optical signal from an optical source in the first data unit. The incoming optical signal is split into a received portion and an outgoing portion. The received optical portion is detected and converted to an electrical signal. A return modulator element modulates the outgoing optical portion and transmits same to the first data unit. The modulation of the outgoing optical portion allows the link to use a single shared optical source, according to the '553 publication.

A full-duplex optical transmission link is disclosed in L. D. Westbrook et al., "Simultaneous bi-directional analogue fiber-optic transmission using an electro-absorption modulator", Electronics Letters, vol. 32, no 19 (Sep. 12, 1996), at pages 1806-07. A downlink laser transmitter and a photodetector receiver are provided at the head end of an optical link consisting of a downlink fiber and an uplink fiber. A single electro-absorption (EA) device is used as a simultaneous photodetector receiver and modulator-transmitter at a remote end of the link. A duplexer is coupled to the EA device at the remote end, and full-duplex communication between the transmitters and the receivers at both ends of the link may be accomplished, as reported in the article.

SUMMARY OF THE INVENTION

The present invention provides a bi-directional optical link suitable for avionics as well as naval platforms, wherein multiple sensors, cameras, radars, and/or antennas can be linked with a processing node in the platform in such a manner as to reduce equipment size, weight, power consumption and cost.

According to the invention, a fiber optic link suitable for avionics or naval platforms having a number of platform data sources, includes a processing node associated with an integrating network of platform, an array of one or more optical transmitter/receiver pairs in the vicinity of the node, and an interface for coupling the array with the integrating network. A number of data modules are each coupled to one or more associated platform data sources, and include (a) an optical receiver for detecting control data input to the module, and (b) an optical modulator arranged to modulate a light signal according to signals received from the associated data sources. One or more optical fibers are coupled between each transmitter/receiver pair of the array, and a corresponding data module.

Each transmitter of the array has an associated laser source operative to supply a downstream light signal including module control data over an optical fiber to an input of a corresponding data module. The modulator at the corresponding module modulates the light signal according to signals from the data sources, and the modulated light signal is returned over a fiber upstream to a receiver of the array.

For a better understanding of the invention, reference is made to the following description taken in conjunction with the accompanying drawing and the appended claims.

DETAILED DESCRIPTION OF THE INVENTION

Figure 2:
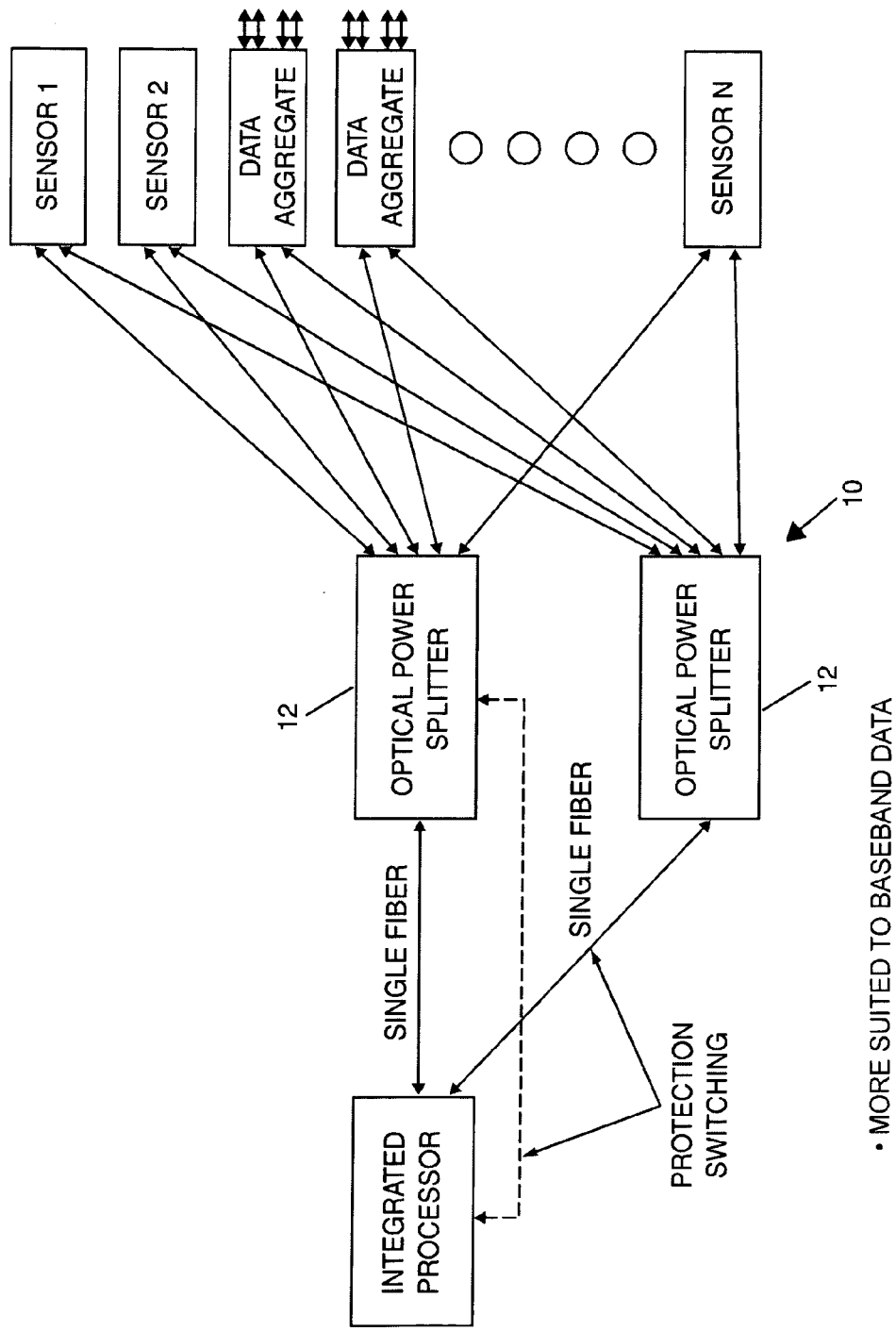
FIG. 2 is a block diagram of a passive optical network.

To reduce the number of transmitters, fibers and other components, and to take advantage of recent innovations in so-called fiber to the home (FTTH) networks, so-called passive optical networks (PON) with desired redundancies may be considered for use in avionics platforms. A PON architecture 10 with protective switching is shown in FIG. 2. The architecture of FIG. 2 may support WDM PON if power splitters 12 are replaced by optical multiplexers (Mux) and demultiplexers (Demux), or dynamically reconfigurable optical add drop multiplexers (ROADM). In the PON 10, data is first multiplexed using TDM. Then, multiple TDM data streams are statistically multiplexed using MAC protocols. Known commercial FTTH architectures support up to 64 end users from a head end depending on the data rates and type of PON. Since at present there is widespread deployment of FTTH based on the overall architecture of FIG. 2, both optical and electronic components are available inexpensively. The architecture also allows transmission of both baseband data and RF signals on the same fiber at either a single or two wavelengths.

Figure 1:
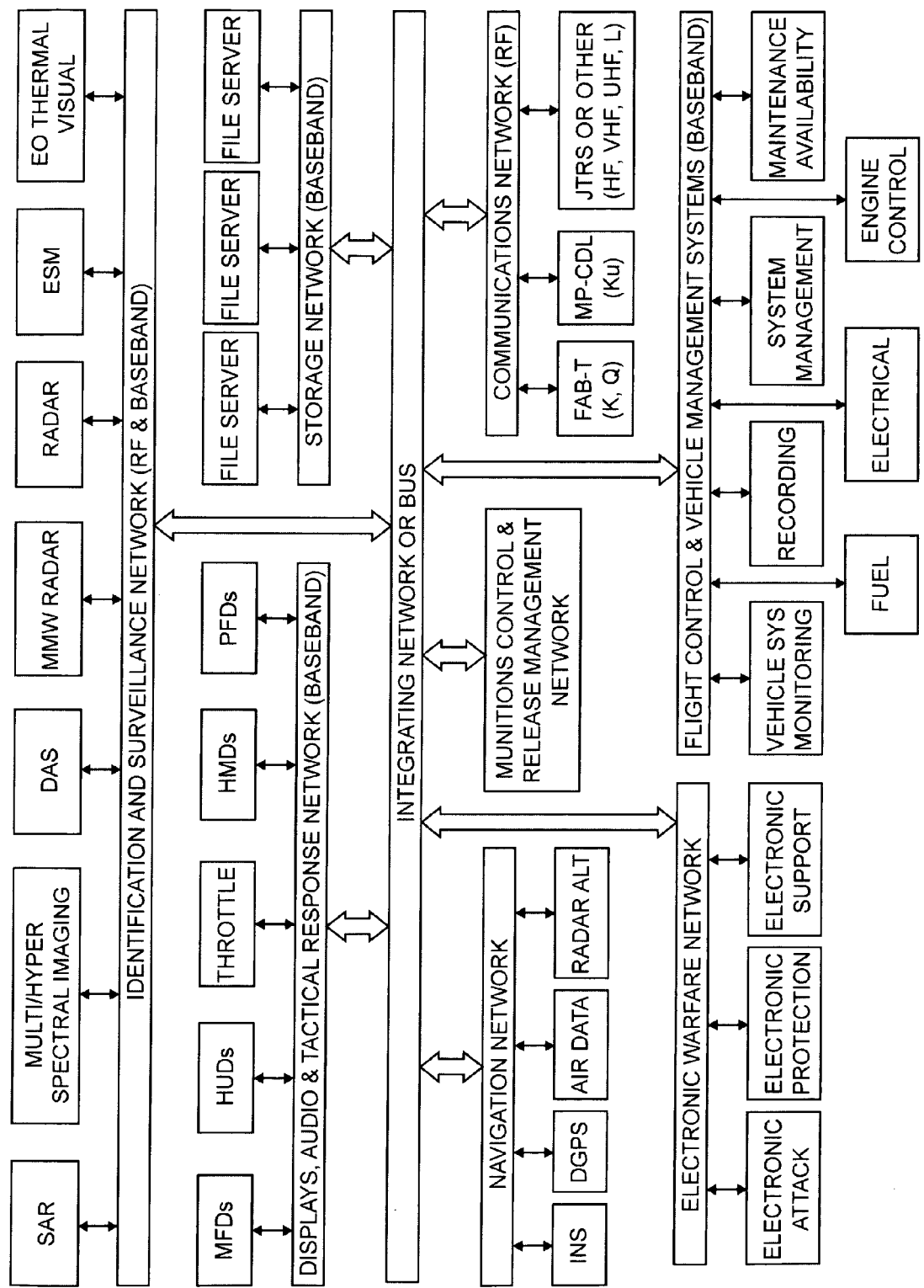
FIG. 1 is an overview of interconnected networks and systems in an airborne platform.
Figure 3:
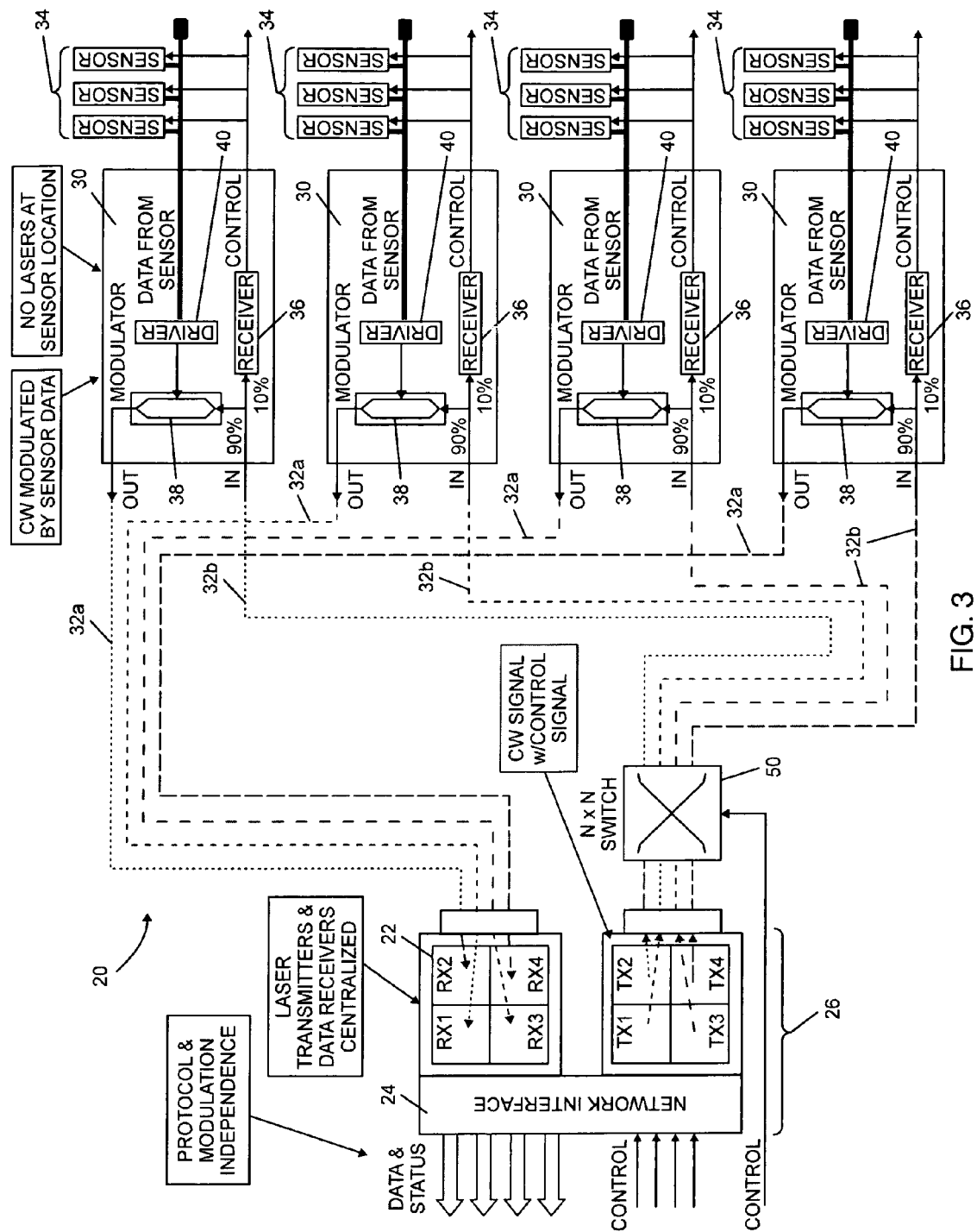
FIG. 3 shows an architecture for a bi-directional optical link according to the invention.

FIG. 3 shows an architecture for a bi-directional optical link 20 according to the invention. The link 20 may be used to enable a common integrating network or bus in the platform of FIG. 1, to communicate by optical fiber with various platform networks, systems and subsystems identified in the figure. As mentioned, airborne platform networks may include networks for navigation, RF communications, tactical response, munitions control, identification and surveillance, electronic warfare, and storage. The platform will also typically includes a flight control and vehicle management system. Each of the mentioned networks and systems must send and receive analog or digital signals to and from the integrating network in either a baseband or RF signal format. As described below, the optical link 20 can replace the many copper wire links presently needed to link the platform networks and systems with the common integrating network in FIG. 1.

As illustrated in FIG. 3, the link 20 includes an array 22 of one or more optical (e.g., laser) transmitter/receiver pairs TX1/RX1, TX2/RX2, . . . , TXn/RXn. The array 22 is preferably maintained in a temperature controlled environment to ensure stability at its operating wavelength(s), and has an associated network interface 24. The array 22 and associated interface 24 define a processing node 26 that may be physically located, for example, within an avionics rack where other like processing nodes 26 may also be installed.

Each of a number of data modules 30 is linked with a corresponding transmitter/receiver pair TXn/RXn by a different pair of optical fibers 32a, 32b. The fibers 32a define upstream links for data (analog or digital) output from the modules 30 to the processing node 26. The fibers 32b define a downstream link for a continuous (CW) light signal that is output from each of the Txn/RXn pairs of the array 22 at the node 26. The CW signal may include control data specific to the module 30 where it is received.

Each data module 30 is coupled to one or more platform data sources 34 (e.g., aircraft sensors, cameras, radars, and/or antennas), and includes an optical receiver 36 that operates to detect downstream control data from the transmitter TXn with which the module is linked by fiber 32b. Each data module 30 also has an optical modulator 38 coupled between the linking fiber pair 32a, 32b, and a driver 40 arranged to receive signals or data from a selected one of the associated sources 34, and to drive the modulator 38 in accordance with the received signals.

As disclosed in FIG. 3, the link 20 does not require that laser sources be provided at the sites of the data modules 30. Instead, the optical modulators 38 within the modules 30 each operate on a CW light signal supplied by a laser source in the transmitter (TXn) that is coupled to the modulator via a downstream fiber 32b. Provided the transmitters in array 22 are maintained in a properly controlled environment, the laser sources will operate reliably at a desired wavelength.

Figure 4A:
FIGS. 4(a) and 4(b) show timings of signals for enabling bidirectional data flow using a single laser source in the link of FIG. 3.

As shown in FIGS. 4(a) & 4(b), and FIGS. 5(a) to 5(c), downstream signals sent from the processing node 26 to the data modules via the fibers 32b, may also contain control and management data within either a digital baseband, or on an RF carrier. In FIG. 4(a), an optical link channel is shared in the time domain to transmit downstream control data from transmitters in the array 22 to the data modules 30, during time interval $t_1$. The receivers in the array receive upstream data from the modules 30 via the fibers 32a during time interval ($t_2-t_1$). At the site of each data module 30, only about 10 to 20% of the downstream CW optical signal may need to be tapped in order for the module's receiver 36 to detect and extract incoming control data. Thus, at least 80% of the CW signal is available for modulation by the modulator 38.

Although the CW laser wavelength may be in any of the 850 nm, 980 nm, 1300 nm or 1500 nm bands, it is preferred to use 980 nm VCSEL arrays. A 980 nm wavelength can be detected by Si, Ge or InGaAs photo diodes. If an InGaAs photo diode is used, it is compatible with 1300-1500 nm operation. This would allow future upgradeability and scalability of the inventive link 20 to CWDM and DWDM using 1300-1500 nm bands. Both the modulator 38 and the tap at each data module 30 may be fabricated in silicon electronic photonic ICs (EPICs) using technologies developed under DARPA's EPIC program. Such would utilize a Ge photodetector in the module receiver 36, and SiGe for the modulator 38, all integrated on the same chip. The modulator and the tap may also be made in GaAs or InP, depending on the wavelength selected and performance desired. For reduced SWAP, the transmitter/receiver arrays 22 may be monolithically integrated at the aggregator node, and ribbon fiber optic cables used for the pairs of link fibers 32a, 32b. Ribbon cables each with 24 or more individual fibers are commercially available.

Also, if desired and as shown in FIG. 3, the fiber links may be reconfigured dynamically by way of, for example, a commercially available N×N wavelength independent optical switch 50 arranged in either the downstream or the upstream link fibers 32b, 32a, so that a given transmitter TXn (or receiver RXn) may be linked to any one of the data modules 30.

Figure 4B:
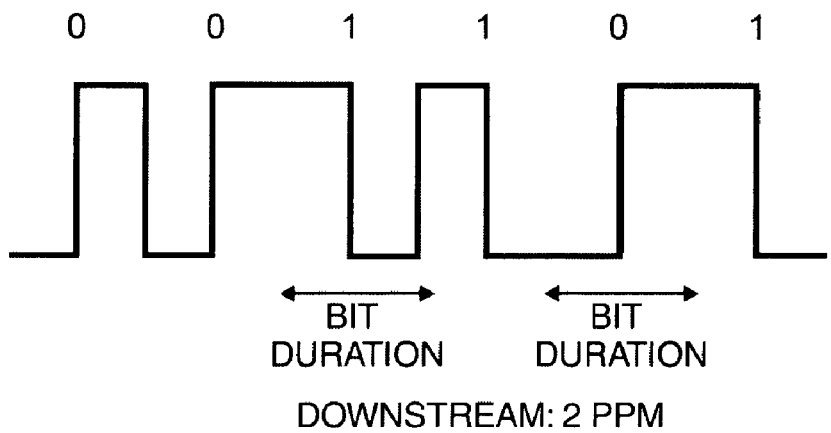
Figure 4C:
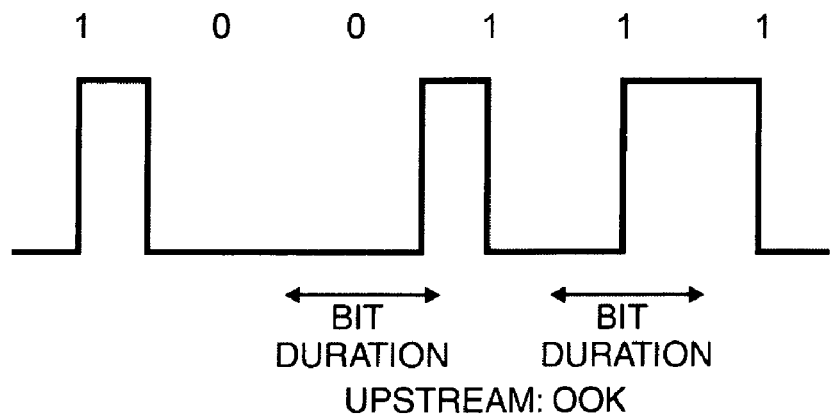

In the data transmission format of FIG. 4(a), data is transmitted in only one direction at a time. FIG. 4(b) shows a transmission format that allows for simultaneous bidirectional (i.e., full duplex) communication with the link 20. In FIG. 4(b), a given transmitter TXn of the array 22 sends a downstream CW signal with 2-PPM (pulse position modulation) representing control data to a linked data module 30. The signal is tapped and remodulated by the modulator 38 at the module 30 according to data provided by the module's data sources 34, using OOK (on-off keying) for upstream transmission back to receiver RXn in the array 22.

Figure 5A:
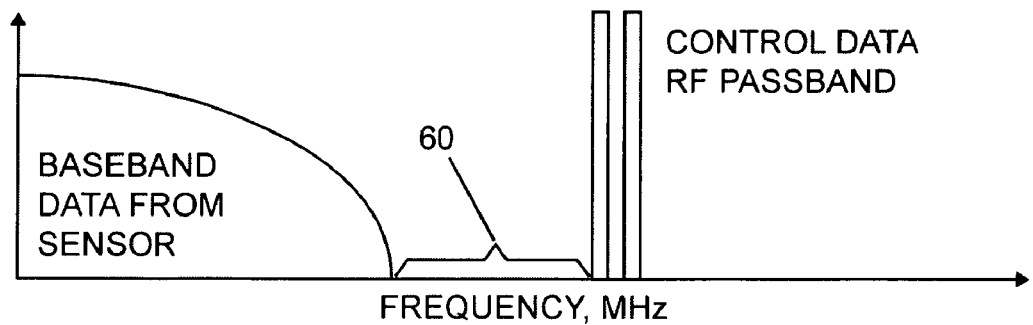
FIGS. 5(a) to 5(c) show options for enabling bidirectional data flow in the frequency domain using a single laser in the link of FIG. 3.
Figure 5B:
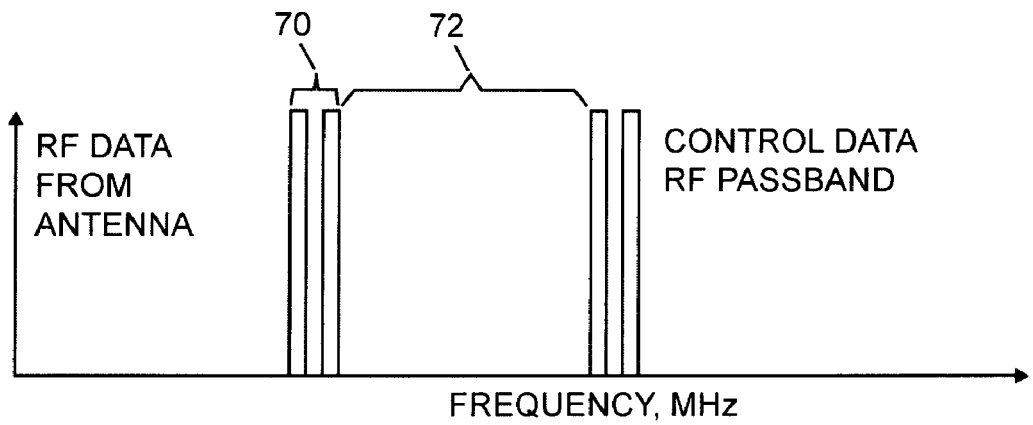
Figure 5C:
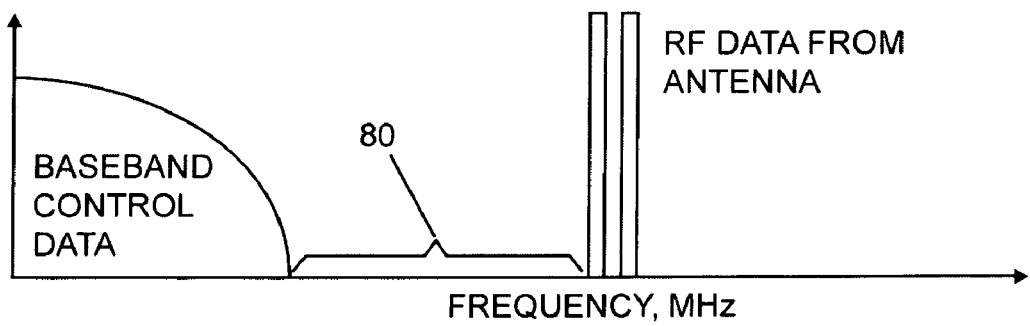

FIGS. 5(a) to (c) show three other options allowing for simultaneous transmission in both directions over the pairs of link fibers 32a, 32b, combining baseband and passband data in the frequency domain. In FIG. 5(a), control data originating from a given transmitter TXn is modulated to lie within a determined RF passband, and sent downstream to the linked data module 30. Data originating from the module's sources 34 is modulated on the signal received from transmitter TXn to lie within a determined RF baseband, with a sufficient guard band 60 between the spectral bounds of the baseband and the passband.

In FIG. 5(b), one or more of the data sources 34 are RF waveforms, e.g., signals from antennas. Upstream communications from the associated module 30 may then be sent over a link fiber 32a via sub-carriers 70 within a determined passband, and with a sufficient guard interval 72 from the RF passband of the downstream control data. Alternatively, as shown in FIG. 5(c), control data can be modulated at a given transmitter TXn to lie within a determined RF baseband, and RF signals from the antennas may be transmitted upstream over a link fiber 32a via sub-carriers within a certain passband, leaving a sufficient guard interval 80 from the baseband containing the downstream control data.

For each of the bi-directional, simultaneous optical link communication scenarios of FIGS. 5(a) to 5(c), the extinction ratio for the baseband signals and the modulation index for the RF passband signals should be optimized to avoid clipping, so that the laser source provided at the transmitter TXn is adequate to allow both the baseband and the passband signals to be carried simultaneously. It has been shown that both signals can be combined within the link 20 with less than a 1 to 2 dB optical power penalty, having no noticeable effect on the link performance.

Figure 6A:
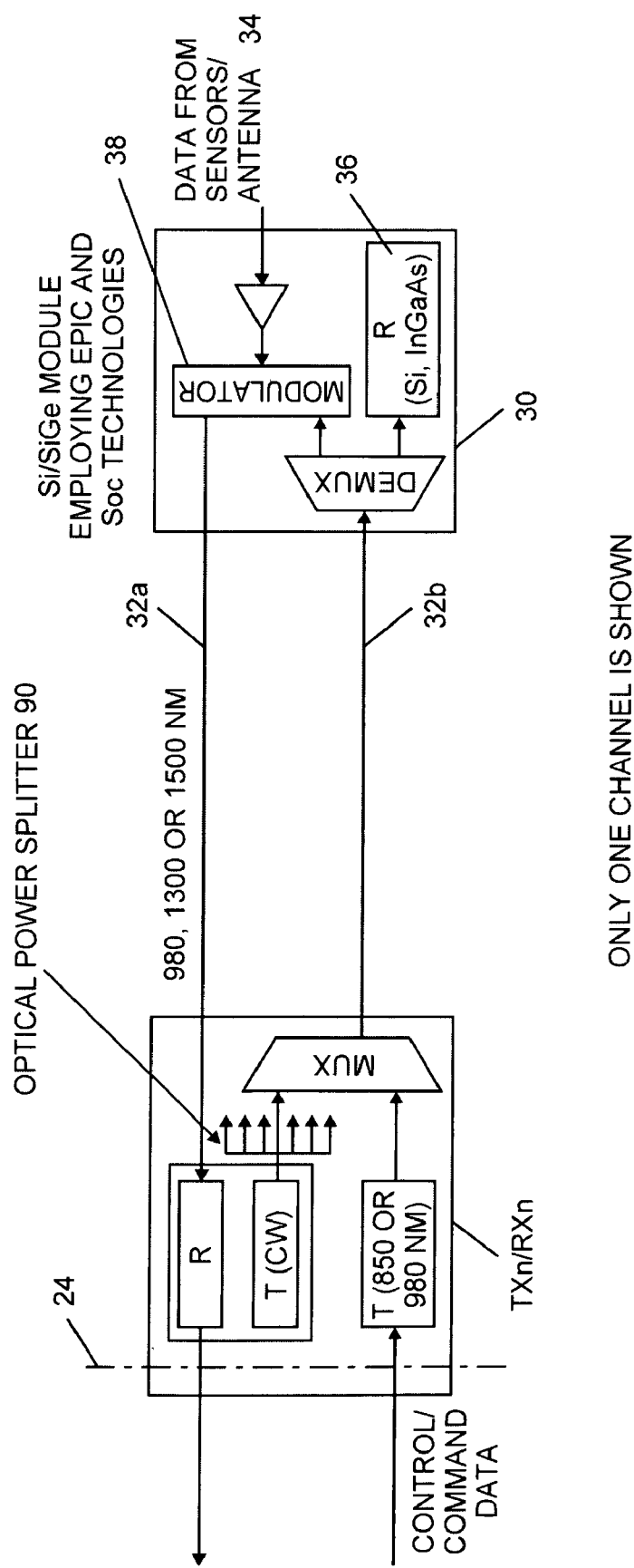
FIGS. 6(a) and 6(b) show a dual wavelength link architecture allocating one wavelength for each direction, and a link enhancement that supports BIT and failure recovery.
Figure 6B:
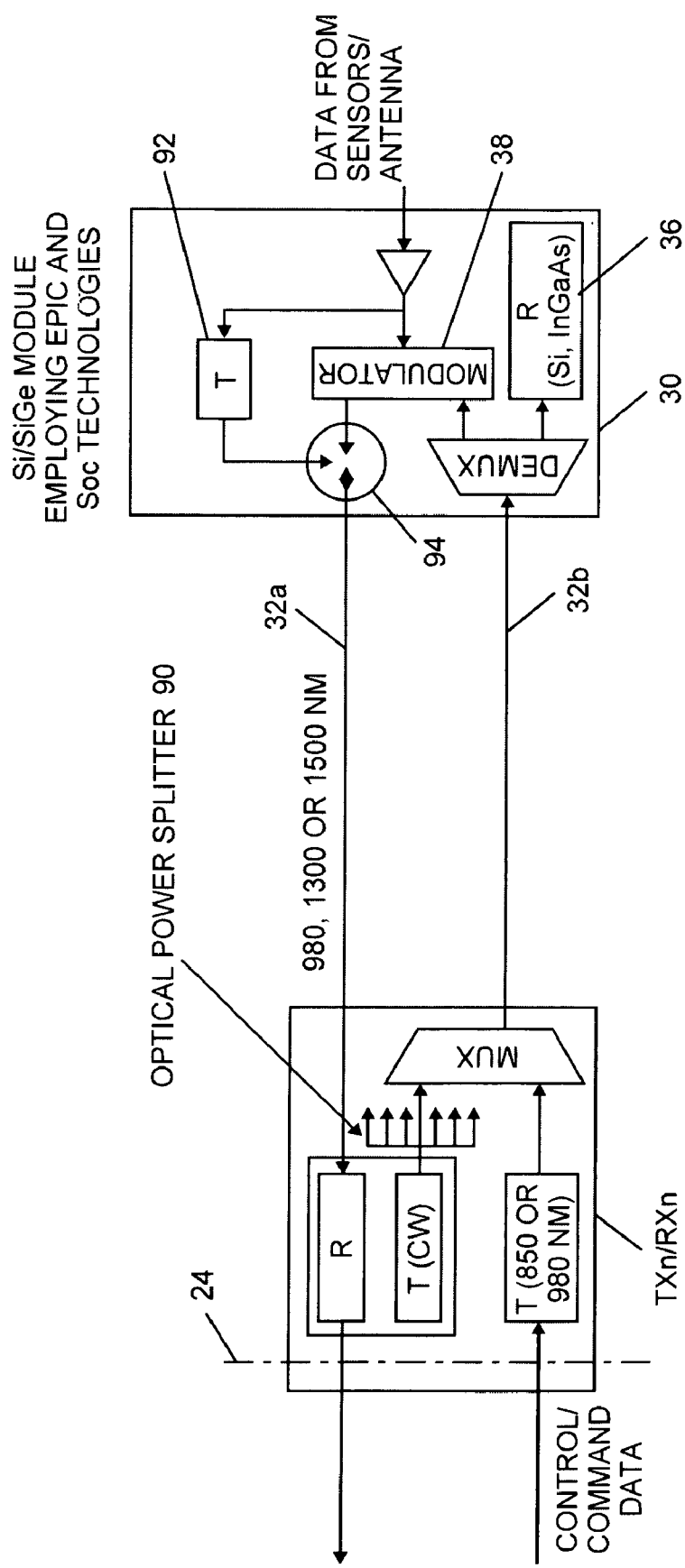

FIG. 6(a) shows a construction that ameliorates any power penalty that might result from a reduction in extinction ratio and optical modulation index due to the RF basebands and passbands of FIGS. 5(a)-(c). Assume in FIG. 6(a) that two optical wavelengths are sent downstream from a given transmitter TXn in the array 22 to the receiver 36 of a corresponding data module 30 on the same link fiber 32b, and that one of the wavelengths carries control and/or command signals.

There are multiple options for selecting the two wavelengths. For example, 850 nm may be used for the control signals, and 980 nm for CW light to be modulated at the module. If a high power 980 nm laser is used, it can act as a source for other transmitters of array 22 by the use of an optical power splitter 90 as shown in FIG. 6(a), so that the total number of lasers will not increase significantly. At the site of each data module 30, both wavelengths are separated, and the CW beam is modulated by modulator 38 to carry data from the module's data sources (e.g., sensors and antennas) upstream over a link fiber 32a to the processing node 26 (FIG. 3). This approach also allows the data module 30 to be made entirely in Si employing EPIC and SoC technologies, thereby reducing SWAP and costs. For protection switching and redundancy, and if necessary, a directly modulated optical transmitter 92 together with an optical switch 94 may be integrated at the module 30 to bypass the module's modulator 36 in the event of a modulator failure.

As disclosed herein, the inventive optical link architecture will allow a reduction in the number of transmitters by as much as 50%. If the TXn/RXn arrays 22 are maintained in a controlled environment, failure rates will be significantly reduced. Because each TXn/RXn pair is arranged within a closed loop, built-in-tests (BIT) can be easily incorporated. Also, since the transmitters and receivers are collocated and if the link loss is known, link performance can be monitored continuously and a warning signal generated sufficiently in advance. Emerging technologies like EPIC, PICs and SoC can be used. Due to point-to-point dedicated links, chance of a single point failure is minimized.

As mentioned, although CW laser wavelengths can be in any of the 850 nm, 980 nm, 1300 nm or 1500 nm bands, it is preferred to use 980 nm VCSEL arrays. A 980 nm wavelength can be detected by Si, Ge or InGaAs PIN photo diodes. This offers the opportunity to integrate both photonic receivers and associated electronic modules on Si using EPIC and System on Chip (SoC) technology currently under development. Lasers operating at 980 nm have many other advantages over 850 nm lasers now used in avionics.

To reduce SWAP further, the TXn/RXn arrays 22 at the processing node 26 may be monolithically integrated, and ribbon fiber cables used for the fiber pairs 32a, 32b. Presently, ribbons containing 20 fibers, single or multimode, with military qualified miniature MT connectors are commercially available and deployed for avionics applications. Ribbon cables with 24 and higher fiber density cables are also emerging.

Data Aggregation and Wavelength Selection

Present optical airborne systems are based largely on spatial division multiplexing (SDM), using 850 nm laser VCSEL arrays and multimode fibers. SDM employs ribbon cables having multiple fibers, multi-fiber connectors and arrays of E/O transmitters and O/E receivers. SDM also allows the use of uncooled components. Because fiber optic cables are relatively light, SDM offers low SWAP and avoids single points of failure. It is preferred that 980 nm, rather than 850 nm, be selected as an operating wavelength in the inventive link 20. The 980 nm wavelength offers significant advantages including more power with better temperature performance, high reliability and eye-safety (by 2.6 dB), and modulation at up to 10 Gb/s. InGaAs detectors of 980 nm have also become available at relatively low cost. Further, while the same GaAs substrate may work at either 850 nm or 980 nm, the substrate is transparent at 980 nm this allowing flip-chip bonding which requires no bond wires and results in better thermal conductivity, higher power handling, lower series resistance and inductance, reduced EMI, and increased self resonant frequency. Moreover, at 980 nm, the laser threshold current is lowered by a factor of 2 with respect to 850 nm. All the foregoing results in an increase in power link margins by several dB.

Moreover, with SDM, advantage can be taken of time division multiplexing (TDM) which combines multiple data streams on a single channel. To reduce the number of laser transmitters, receivers and fibers, TDM data rates per channel can be increased up to 10 Gb/s because TDM electronics is inexpensive and photonics components are widely available to support this data rate. The cost of 10 Gb/s components has also dropped significantly due to their widespread commercial use. Analog signals may therefore be digitized at their source, and the resulting data multiplexed into a TDM data stream.

TDM channels are transported using known Ethernet, Fiber Channel, or SONET/G709 protocols in which data scales up by a factor of 10, 2, and 4, respectively. While Ethernet has been avoided in avionics because it is not deterministic, the emergence of Avionics full duplex Ethernet (AFDX) which is a deterministic version of Ethernet, may allow Ethernet to become more popular in avionics. AFDX has the potential of replacing ARINC 429, IEEE 1394, and US MIL-STD-1553B. Presently, AFDX is limited to 100 Mbps so it would be necessary to scale the protocol up to 1 Gbps and 10 Gbps to gain significant value for optical networking on air platforms. Ethernet offers significant lower cost, flexible provisioning and rapid service reconfiguration, automatic equipment self-identification, simplified network management, remote management and software upgrades, and software-activated VLANs. Commercial networks are also moving toward all Ethernet, and work is in progress to write standards for a 100 Gb/s Ethernet. Accordingly, Ethernet is a preferred protocol for carrying most types of traffic on avionics platforms.

For RF signals, frequency division multiplexing (FDM) is more attractive. FDM carries multiple RF sub-carriers on a single wavelength carrier, and is widely used by Cable TV, satellite TV, and in fiber to the home (FTTH) installations. For avionics applications, FDM can be used to deliver and receive RF signals to and from aircraft antennas. While the use of FDM may reduce SWAP significantly, only limited R&D is currently being performed in applying FDM technology to avionics, however. More work should be undertaken in this area to leverage its advantages.

To increase the data rate per fiber further, dense or course wavelength division multiplexing (DWDM or CWDM), in which multiple wavelengths are carried over the same fiber, are preferably used. The difference between DWDM and CWDM is in the wavelength separation between neighboring channels, and the number of channels on a fiber. Either is very attractive for carrying large amounts of data over long distances, thus saving costs associated with fiber optic cables and optical amplifiers and offering the advantage of dynamically reconfigurable optical add drop multiplexers (ROADM).

DWDM also minimizes the number of required cables, connectors, switches, and couplers, and significantly simplifies the routing and building redundancy. The SAE has recognized the importance of WDM-LAN to implement a flexible, scalable and upgradeable optical network supporting the systems and subsystems aboard an avionics platform. SAE document AS5659 defining WDM backbone network requirements is under preparation. Because of the relatively short distances over which data communications are carried out in an airborne platform, and lack of a need for long fiber runs and optical amplifiers, DWDM may not offer significant cost advantages unless complete DWDM functionality is integrated on, e.g., just two chips, one for the transmitter and the other for receiver. Transmitter and receiver PICs supporting 10 WDM channels with 10 Gb/s each are now commercially available. Optical wavelengths for CWDM or DWDM should preferably be in the 1300 to 1600 nm range. In DWDM, the center wavelength of lasers and Mux/Demux must be controlled very accurately using, e.g., TE coolers and heaters which are unnecessary in CWDM thus making CWDM more attractive. It is also noted that DWDM may add a single point of failure unless enough redundancy is built-in. And since wavelength specific components are needed, the inventory of required components could also be quite significant for DWDM.

Whether CWDM or DWDM is selected, it is preferred to use multimode optical fibers in the inventive link 20. Single mode (SM) fibers face numerous challenges on avionics platforms. For example, to avoid failure of SM connectors, special expanded beam connectors must be used which add about one dB loss. Since the cables on an airframe are installed in multiple sections and are joined with connectors, such SM connectors in large quantity may increase power losses and require use of optical amplifiers in which the health and wavelength of pump lasers must be carefully controlled. The electronics needed for such control increases SWAP.

To avoid the above complexities arising from the use of DWDM components and to reduce SWAP and costs, multiplexing technologies selected for the link 20 are, in order of preference, TDM or banded FDM, SDM, and CWDM with multi-mode fiber. Deploying some single mode dark fiber for future DWDM may be considered, would not increase cost and weight significantly, and would improve the lifetime of the platform infrastructure by supporting upgradeability, repair, and replacement.

Whether incorporated in an airborne or a naval platform, the inventive optical link allows flexibility to support technology insertion, modularity, and long-term supportability enabling a "wire once" approach to scale over the life cycle of the platform. There is no single point of failure and the platform will be tolerant of multiple faults. Capabilities for health monitoring with built-in-tests (BITs) for fault and performance management including path redundancy, automatic protection and restoration, and survivability, may all be implemented. Control and management functions such as multi-level security, support for unicast, multicast and broadcast operation, software controlled configurability, connectivity and fault tolerance can be supported. Equally important, the platform will be robust to thermal and mechanical shock, sinusoidal or random vibration, and EM noise and interference, and it will function over a demanding range of environmental conditions.

Figure 7:
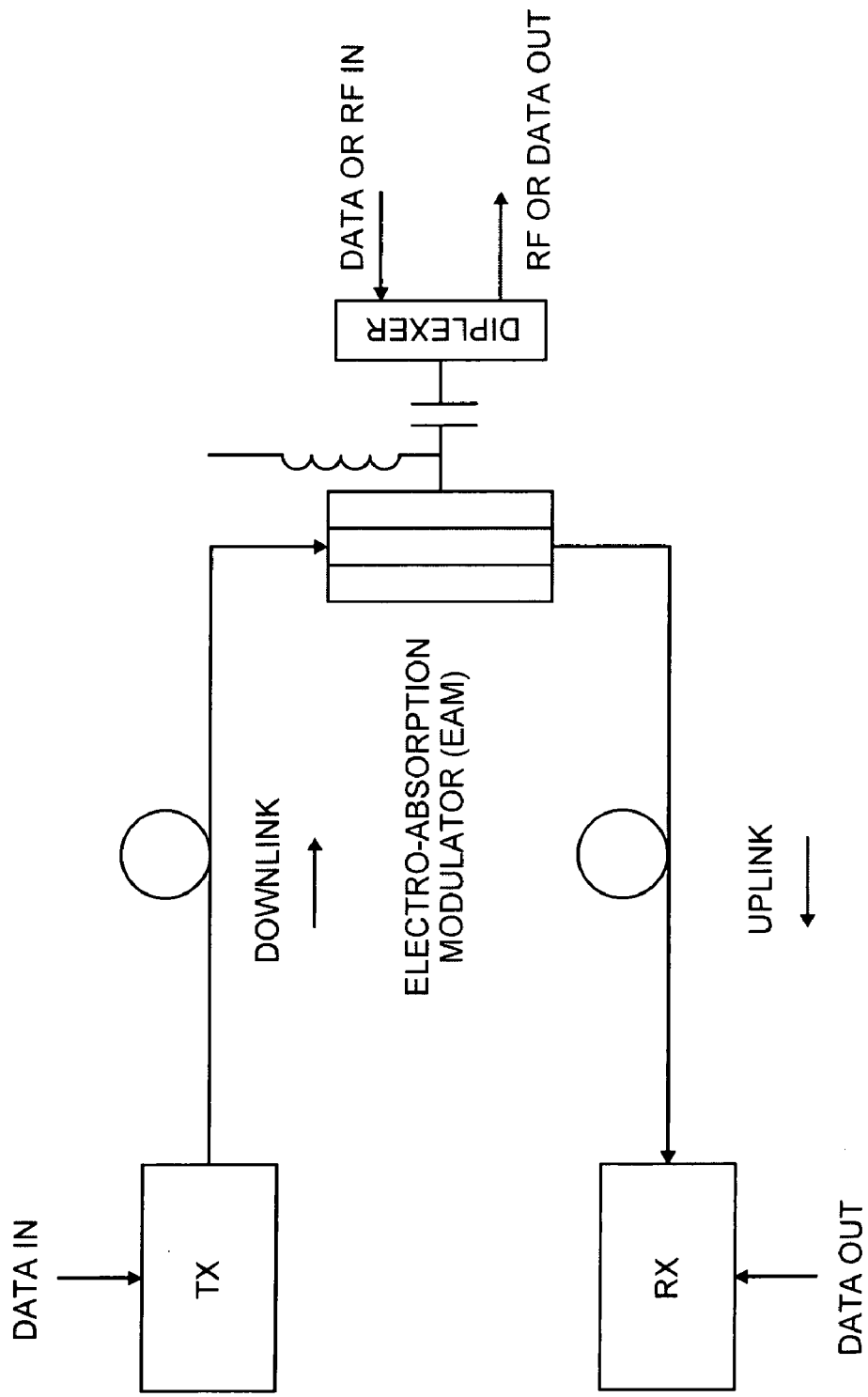
FIG. 7 shows a modification in the architecture of the optical link of FIG. 3.

While the foregoing represents preferred embodiments of the invention, it will be understood by those skilled in the art that various modifications and changes may be made without departing from the spirit and scope of the invention. For example, in FIG. 7, the functions of the receiver 36 and the modulator 38 in the data module 30 in FIG. 3, are performed using an electro-absorption modulator (EAM) and a diplexer coupled to a control terminal of the EAM. Because this configuration enables the EAM to act both as a light modulator and detector, no splitter or separate receiver is needed in the data module 30.

Figure 8:
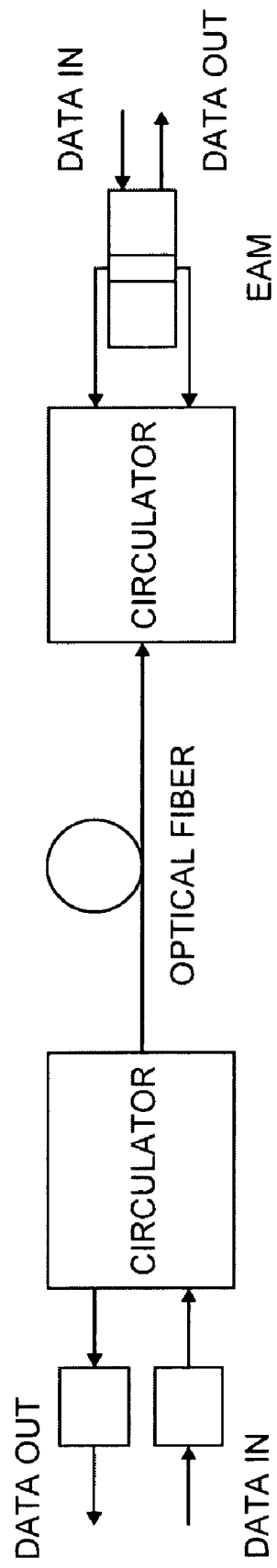
FIG. 8 shows another modification in the architecture of the optical link of FIG. 3.

FIG. 8 shows another modification wherein circulators are coupled at each end of a single optical fiber link between a data module 30 and a TXn/RXn pair of the array 22 in FIG. 3. Each of the link fiber pairs 32a, 32b in FIG. 3 may therefore be replaced by the single fiber and end circulators as in FIG. 8.

Accordingly, the invention includes all such modifications and changes as come within the bounds of the following claims.

We claim:

1. A fiber optic link suitable for avionics or naval platforms having a number of platform data sources, comprising:
    a processing node associated with an integrating network or bus of platform;
    an array of one or more optical transmitter/receiver (TXn/RXn) pairs located in the vicinity of the processing node;
    an interface for coupling said array with the integrating network;
    a number of data modules each of which is coupled to one or more associated platform data sources and includes (a) an optical receiver operative to detect control data input to the module, and (b) an optical modulator arranged to modulate a light signal according to signals received from the associated data sources, and
    at least one optical fiber coupled between a given transmitter/receiver pair of said array, and a corresponding data module;
    wherein a given transmitter of the array has an associated laser source operative to supply a light signal including said control data to an input of a corresponding data module downstream over an optical fiber, the modulator of the corresponding data module modulates the light signal according to the signals received from the associated data sources, and the modulated light signal is returned to an array receiver upstream over an optical fiber.

2. A fiber optic link according to claim 1, wherein the optical transmitter/receiver pairs of the array are co-located in a temperature controlled environment to reduce operating failure rates.

3. A fiber optic link according to claim 1, wherein the optical transmitter/receiver pairs of the array are constructed and arranged to operate at wavelengths in one or more bands selected from among 850 nm, 980 nm, 1300 nm and 1500 nm.

4. A fiber optic link according to claim 1, wherein transmitters of the array include light sources comprised of vertical cavity surface emitting lasers (VCSEL) or edge emitting lasers.

5. A fiber optic link according to claim 4, wherein the VCSEL or edge emitting laser sources are operative in a 980 nm wavelength band.

6. A fiber optic link according to claim 1, including an N×N optical switch coupled in either the downstream or the upstream optical fibers so that a given transmitter or receiver of the array can be linked with a selected one of the data modules, wherein N is a number of transmitters or receivers used.

7. A fiber optic link according to claim 1, wherein transmitters of the array are operative to supply the light signal including the control data to the data modules, and modulators at the data modules are operative to return the modulated light signal to the receivers of the array, in a time domain format.

8. A fiber optic link according to claim 1, wherein transmitters of the array are operative to modulate the control data onto the downstream light signal using pulse position modulation, and modulators at the data modules are operative to modulate the data provided by their data sources onto the upstream light signal using on-off keying.

9. A fiber optic link according to claim 1, wherein transmitters of the array are operative to supply the light signal including the control data to the data modules, and modulators at the data modules are operative to return the modulated light signal to the receivers of the array, in a frequency domain format.

10. A fiber optic link according to claim 9, wherein the control data is allocated to lie within a radio frequency (RF) passband with a lowest frequency f1, and the data provided by the data sources is allocated to lie in a RF baseband with a highest frequency f2, and a sufficient guardband exists between f1 and f2.

11. A fiber optic link according to claim 9, wherein the control data is allocated to lie within a first radio frequency (RF) passband, and RF data representing an antenna data source is allocated to lie within a second RF passband.

12. A fiber optic link according to claim 9, wherein the control data is allocated to lie in a RF baseband, and RF data representing an antenna data source is allocated to lie within a RF passband.

13. A fiber optic link according to claim 1, including an optical power splitter coupled to an output of the laser source at one of the transmitters of the array, wherein outputs of the splitter are arranged to serve as light sources for association with other transmitters of the array.

14. A fiber optic link according to claim 1, including a directly modulated optical transmitter and an optical switch arranged to bypass the modulator at one of the data modules in the event of a modulator failure.

15. A fiber optic link according to claim 1, wherein transmitters of the array are constructed and arranged to modulate the control data on a first downstream light signal at a certain wavelength, and to supply a second downstream light signal at a different wavelength to be modulated at the data modules.

16. A fiber optic link according to claim 1, wherein the optical receiver and the optical modulator of at least one of the data modules, are in the form of an electro-absorption modulator (EAM), and a diplexer coupled to a control terminal of the EAM.

17. A fiber optic link according to claim 1, wherein a single optical fiber is provided for carrying both downstream and upstream signals between at least one transmitter/receiver pair of said array, and a corresponding data module.

18. The link of claim 17, including a first circulator coupled between one end of the single fiber and the transmitter/receiver pair, and a second circulator coupled between the opposite end of the fiber and the data module.

* * * * *